May 12, 1970     H. W. KAATZ     3,511,269

AUTOMATIC VALVE

Filed Sept. 9, 1965     2 Sheets-Sheet 1

INVENTOR.
HERBERT W. KAATZ
BY Bosworth, Sessions,
Herrstrom & Knowles
ATTORNEYS

May 12, 1970   H. W. KAATZ   3,511,269
AUTOMATIC VALVE

Filed Sept. 9, 1965   2 Sheets-Sheet 2

INVENTOR.
HERBERT W. KAATZ
BY Bosworth, Sessions,
Herrstrom & Knowles
ATTORNEYS

United States Patent Office 3,511,269
Patented May 12, 1970

3,511,269
AUTOMATIC VALVE
Herbert W. Kaatz, Elyria, Ohio, assignor to Airborne Mfg. Co., Elyria, Ohio, a corporation of Ohio
Filed Sept. 9, 1965, Ser. No. 486,169
Int. Cl. F16k 17/20
U.S. Cl. 137—498
11 Claims

ABSTRACT OF THE DISCLOSURE

An automatic valve and particularly a flow-sensitive, normally open, two-way valve that closes in response to a predetermined pressure drop across the valve. Specifically, the pressure drop tending to close the valve is produced by "lift" resulting from the increase in velocity of fluid flow produced between two closely spaced surfaces associated with the valve members, which "lift" tends to draw the surfaces and valve members together and into a closed position. The "lift" forces may be augmented by static and dynamic pressures to which the valve members are responsive.

---

The invention is described and disclosed herein in the form of a cylinder head drain valve for use on light aircraft engines employing fuel injection. It will be understood that valves comprehended by this invention, and even the particular valve shown and described herein, have broader utility than that of a cylinder head drain valve and that the disclosure herein of the invention in the embodiment of a cylinder head drain valve is only for purposes of illustration.

In the operation, and particularly during starting, of light aircraft engines employing fuel injection, it is important to avoid the accumulation of excess raw and unburned fuel in the cylinder head while the engine is being cranked. This can be done by purging the cylinder head of excess fuel through a valve having an inlet into the engine and an outlet opening to atmosphere. During starting, the valve remains open; but, when the engine fires and starts, the valve automatically closes at a predetermined manifold pressure above atmospheric pressure. During normal running, the valve remains closed. When the pressure difference between the inlet and outlet of the valve falls below a predetermined level, the valve automatically opens, placing its inlet and the engine cylinder head into communication with atmospheric pressure through the outlet opening of the valve.

It is an object of this invention to provide a normally open, two-way valve which will automatically close in response to a predetermined pressure differential across it. In particular, it is an object to provide such a valve that is small, lightweight, easy and economical to manufacture, reliable, accurate, sensitive, and which has a fast operating response, particularly when closing.

These and other objects and advantages of this invention will become apparent from the following description taken together with the accompanying drawings in which.

Figure 1:
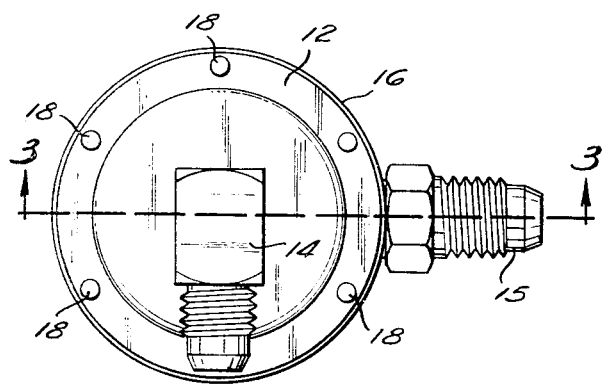
FIG. 1 is a top elevation view of a double diaphragm cylinder head drain valve embodying this invention.
Figure 2:
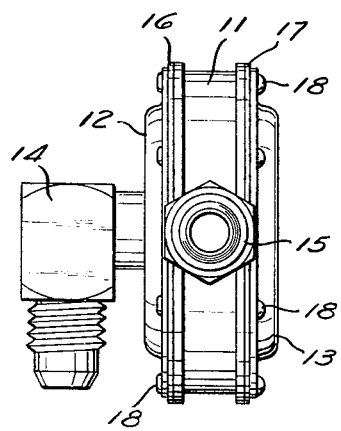
FIG. 2 is a side elevation view of the valve shown in FIG. 1.

FIGS. 1 through 4 show a cylinder head drain valve having two movable and flexible diaphragms and which is referred to as a double diaphragm valve. The valve housing is generally circular and like a thickened disc and is conveniently made up of an annular center spacer ring 11 held between upper and lower circular cover plates 12 and 13, respectively. The two cover plates 12 and 13 and spacer ring 11, together, form a closed chamber.

Located at the center of upper cover plate 12 is an elbow-type fitting 14 comprising an opening into the closed chamber. A radial passage is provided through the wall of spacer ring 11 in which is fitted and sealed a straight fitting 15 comprising another opening into the closed chamber. When connected as a cylinder head drain valve, fitting 14 is an inlet connected to the engine cylinder head and fitting 15 is an outlet open to atmosphere.

Figure 3:
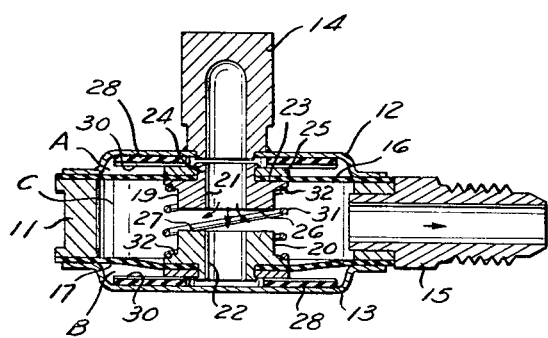
FIG. 3 is a side elevation in full section of the valve shown in FIGS. 1 and 2 taken in the plane of line 3—3 in FIG. 1 and showing the valve in its open position.
Figure 4:
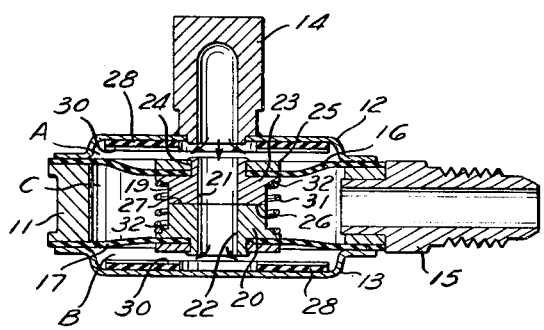
FIG. 4 is a view similar to FIG. 3 but showing the valve in its closed position.

The chamber enclosed within spacer ring 11 and cover plates 12 and 13 is divided axially into three portions, marked A, B, and C in FIGS. 3 and 4, by wall-like primary diaphragm 16 and secondary diaphragm 17. Primary diaphragm 16 is interposed and extends between the inlet and outlet openings in the chamber forming an inlet sub-chamber A on its side toward the inlet opening and an outlet sub-chamber C on its other side toward the outlet opening. Secondary diaphragm 17 closes off a portion of the chamber, but is not positioned between the inlet and outlet openings. The diaphragms are preferably formed of lightweight, flexible yet strong material and are large enough so that their outer peripheries overlie the annular end faces of spacer ring 11 and are clamped and held thereagainst by cover plates 12 and 13. The diaphragms are each able to belly a limited extent toward and away from each other. The assembly of cover plates 12 and 13 and spacer ring 11 and diaphragms 16 and 17 as shown in the drawings can be accomplished easily and effectively by means of a number of circumferentially spaced, axially directed rivets 18. The sub-chambers A and B above and below diaphragms 16 and 17, respectively, are axially shallower than the central chamber C formed between diaphragms 16 and 17.

The diaphragms 16 and 17 carry valve members 19 and 20, respectively, mounted on and through each diaphragm at its center. Valve members 19 and 20, as shown, have an axially short and generally cylindrical form and are provided with axial central orifices 21 and 22, respectively. One end of each valve member 19 and 20 has a reduced outside diameter forming a radial shoulder 23 on the member and, together with the axial central orifice through the member, a tubular axial extension 24. The latter extends through central openings in the diaphragm and retaining washer 25. The central portion of each diaphragm is clamped between radial shoulder 23 of the valve member mounted on it and its cooperating retaining washer 25.

The other end of valve member 19 and valve member 20 is provided with an annular end face 26 and 27, respectively, each of which comprises a valve seat surrounding a central orifice in a valve member. End faces 26 and 27 are disposed within sub-chamber C opposite each other in a facing relationship so as to form a passage between them through which fluid introduced into the valve through inlet fitting 14 and central orifice 21 in valve member 19 must pass on its way to the valve outlet fitting 15. The cross-sectional area of the passage thus formed between end faces 26 and 27 varies as the spacing between the end faces of valve members 19 and 20 changes through movement of the two diaphragms. The spacing between the diaphragms and the freedom and limits of their movements toward and away from each other is such as to permit end faces 26 and 27 to move into and out of engagement with each other.

Figure 5:
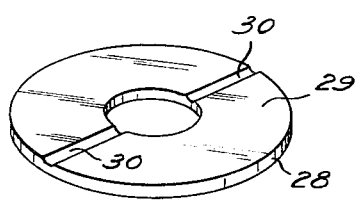
FIG. 5 is a perspective view in enlarged scale of a cushioning washer from the valve shown in FIGS. 1 through 4.
Figure 6:
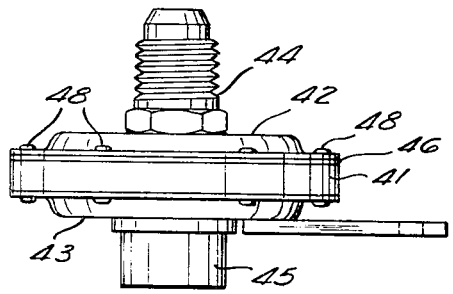
FIG. 6 is a side elevation view of a single diaphragm cylinder head drain valve embodying this invention.

A cushioning washer 28, such as shown in enlarged scale in FIG. 5, is provided between each cover plate 12 and 13 and its adjacent diaphragm and valve member. It will be noted that the washer, preferably formed of relatively soft, resilient material, is circular and has a central opening coaxially related to the central orifice of the adjacent valve member. In at least one of annular faces of each washer, e.g. face 29, there are provided passages or grooves 30 joining the outer periphery of the washer and its central opening. The purpose and function of these cushioning washers 28 with grooves 30 therein will be explained more fully in connection with the description of the operation of the valve below.

The only other structural element present in the valve is a helical compression spring 31 compressed between and supported by suitable outer radial flanges 32 on valve members 19 and 20 so that the spring force tends to hold valve members 19 and 20 apart and, in particular, their annular end faces 26 and 27, respectively, axially spaced from each other.

It will be noted that central orifice 21 through valve member 19 mounted in primary diaphragm 16 is generally aligned with the inlet passage in elbow fitting 14 entering sub-chamber A and provides a passage from sub-chamber A into sub-chamber C. Central orifice 21 is not, however, directly joined to the entry of the inlet passage into sub-chamber A since tubular extension 24 of valve member 19 is always spaced at least a small distance from the interior end of elbow fitting 14 by cushioning washer 28. Grooves 30 in cushioning washer 28 mounted on cover plate 12 always maintain communication between inlet fitting 14 and all of sub-chamber A, even when valve member 19 is urged against the washer by spring 31, for example.

Valve member 20 mounted in secondary diaphragm 17 provides, through its central orifice 22, a passage between sub-chambers B and C. As in sub-chamber A, cushioning washer 28 and its grooves 30 in sub-chamber B maintain communication between central orifice 22 and sub-chamber C, even when valve member 20 is urged against the washer.

FIG. 3 of the drawings shows the double diaphragm, two-way valve in its open position with annular end faces 26 and 27 of valve members 19 and 20, respectively, axially spaced apart. The open valve permits fluid to enter sub-chamber A through inlet elbow fitting 14, sub-chamber C through central orifice 21 in valve member 19, and sub-chamber B through central orifice 22 in valve member 20. The fluid, of course, is able to leave the valve through the outlet passage in straight fitting 15.

FIG. 4 of the drawings shows the double diaphragm, two-way valve in its closed position. The valve is closed when annular end faces 26 and 27 of valve members 19 and 20 come together in facewise engagement and cut off the inlet passage in elbow fitting 14 and sub-chamber A from communication with sub-chamber C through the central orifice 21 in valve member 19. The inlet passage in elbow fitting 14 and sub-chamber A are, however, placed in direct communication with sub-chamber B through the axially aligned and now joined-together central orifices 21 and 22 in the valve members. The two valve members 19 and 20 are permitted to move into engagement with each other by the movable diaphragms upon which they are mounted.

When the valve is employed as a cylinder head drain valve, the valve members 19 and 20 are normally held apart and the valve open by the force of compression spring 36. Valve members 19 and 20 are drawn together against the force of compression spring 31 by unbalanced forces acting on the movable diaphragms 16 and 17 carrying them. Looking first to primary diaphragm 16, it will be noted that the upper or sub-chamber A side of the diaphragm is always subjected to static inlet pressure introduced through elbow fitting 14. Cushioning washer 28 in sub-chamber A always spaces the inner end of elbow fitting 14 from valve member 19 in the primary diaphragm while the radial passages 30 in cushioning washer 28 place those portions of sub-chamber A radially outward of the valve member and mounting washer 25 in positive communication with static inlet pressure.

The lower or sub-chamber C side of primary diaphragm 16 is subject to the pressure in sub-chamber C which, if there is any fluid flow through central orifice 21 in valve member 19, is less than the pressure present in sub-chamber A and on the other side of the diaphragm because of pressure drop through central orifice 21. Assuming fluid flow through orifice 21, the difference in static pressures present on the substantially equal areas of the opposite sides of primary diaphragm 16 tends to move diaphragm 16 downwardly, as shown, and away from upper cover plate 12 and against the force of helical spring 31.

Considering secondary diaphragm 17, its upper and sub-chamber C side is subject to the pressure present in sub-chamber C. Its lower and sub-chamber B side is acted upon both by a static pressure substantially equal to the static pressure in sub-chamber C and by an additional pressure or force present in sub-chamber B resulting from a ram effect produced by fluid flow from inlet fitting 14 through central orifice 21 in valve member 19 and straight into and through orifice 22 in valve member 20 and into sub-chamber B.

In addition to the static and ram effect pressures mentioned, above, primary and secondary diaphragms 16 and 17, and particularly the valve members 19 and 20 mounted thereon, are drawn toward each other when fluid flowing axially through central orifice 21 in valve member 19 passes radially out from between the opposing and closely spaced apart annular end faces 26 and 27 of the valve members. This force, tending to draw the valve members and their diaphragms together, results from a reduction in pressure between the annular end faces of the valve members and in sub-chamber C produced by the increased velocity of fluid flowing through the passage between the end faces in accordance with Bernoulli's equation. The magnitude of the force thus produced tending to draw the two members of the diaphragms together increases as the two annular end faces 26 and 27 of the valve members approach each other. As a result, this self-augmented, flow-sensitive action produces a snap action effect so that, when fluid flow through the valve reaches a predetermined level, valve members 19 and 20 are snapped together with their two annular end faces in tight engagement and fluid flow through the valve between inlet elbow fitting 14 and straight outlet fitting 15 is effectively prevented.

The forces tending to draw valve members 19 and 20 and their diaphragms together are opposed by force of helical compression spring 31 tending to hold them apart. When the force of compression spring 31 exceeds the sum of the forces tending to hold valve members 19 and 20 together, the valve opens. Cushioning washers 28 serve to absorb some shock and to quiet any noise and clatter produced by the sudden and/or frequent opening of the valve.

As shown in the drawings, the annular end faces 26 and 27 comprising the valve seats effect a metal-to-metal seal when the valve is closed. If desired, resilient seats or seals in the seats can be used.

The closing and opening pressures and/or fluid flow can be varied to suit different applications for the valve by changing the size of orifice 21, the maximum spacing between annular end faces 26 and 27, areas of movable diaphragms 16 and 17, the contours of the end faces 26 and 27, and/or the spring force produced by spring 31.

A single diaphragm automatic two-way valve embodying this invention is shown in FIGS. 6 through 9 of the drawings. Like the double diaphragm valve, the valve housing is generally circular and consists of an annular center spacer ring 41 held between upper and lower circular cover plates 42 and 43, respectively.

The housing encloses a chamber having an inlet through fitting 44 in the center of upper cover plate 42 and an outlet through fitting 45 in the center of lower cover plate 43.

The housing chamber is divided axially into two sub-chambers P and Q by wall-like diaphragm 46. Diaphragm 46 is interposed and extends between the inlet and outlet openings of the chamber. As in the double diaphragm valve described above, diaphragm 46 is preferably formed of a lightweight, flexible material, permitting it to freely move and belly a limited extent when clamped about its outer periphery between spacer ring 41 and cover plate 42. Diaphragm 46 is conveniently held in place and the housing fastened together by means of a number of circumferentially spaced rivets 48.

Diaphragm 46 carries a valve member 49 which cooperates with another valve member 50 mounted on lower cover plate 43 and conveniently formed as a part of outlet fitting 45. Valve member 49 is generally cylindrical and provided with an axial central orifice 51. An outer flange 52 of substantial radial extent is formed on one end of valve member 49 and surrounds the end of central orifice 51 on the outlet side of diaphragm 46. Valve member 49 is mounted through a central opening in diaphragm 46, the diaphragm being clamped between radial flange 52 of the valve member and a retaining washer 53. It will be apparent that the valve member 41 closely resembles the diaphragm-mounted valve members 19 and 20 of the valves shown in FIGS. 1 through 5 and is mounted on and related to its diaphragm in a similar manner.

Radial flange 52 provides valve member 49 with an annular end face 54 comprising a valve seat surrounding central orifice 51. Valve member 50 is provided with a plane circular surface 55 oppositely disposed and facing annular end face 54. Annular end face 54 of movable valve member 49 and plane circular surface 55 of fixed valve member 50 cooperate as a movable valve seat and a stationary valve closure member, respectively, to permit and prevent flow of liquid from sub-chamber P to sub-chamber Q and thus through the valve.

Annular end face 54 and circular surface 55, in their facing relationship, form a restricted passage between them through which fluid introduced into the valve through inlet fitting 44 and central orifice 51 of the movable valve member passes on its way to the valve outlet 45. As valve member 49 moves toward and away from fixed valve member 50 with movement of diaphragm 46, the transverse dimension of the passage between end face 54 and circular surface 55 varies. The spacing between annular end face 54 and circular surface 55 and freedoms and limits of the movement of valve member 49 toward and away from valve member 50 is such as to permit end face 54 and circular surface 55 to move into and out of valving engagement with each other.

As in the double diaphragm valve described above, a cushioning washer 58 is provided between cover plate 42 and diaphragm 46 and valve member 49. Cushioning washer 58 is similar to that shown in enlarged scale in FIG. 5, is preferably formed of relatively soft resilient material and is circular and has a central opening surrounding central orifice 51 in valve member 49. It is provided with radial grooves 60, insuring communication between the inlet passage in central orifice 51 and the entire upper side of diaphragm 46 even when valve member 49 engages washer 58.

Valve member 49 is urged away from valve member 50 by a helical compression spring 61 compressed between and supported by suitable radial flanges 62 on the two valve members.

From the foregoing description of the single diaphragm valve, it will be apparent that, like the double diaphragm valve, it responds to the pressure differential across primary diaphragm 46 provided by fluid flow through central orifice 51; and, further, that it is flow sensitive as a result of the Bernoulli effect developed between the variably spaced and oppositely facing end face 54 and circular surface 55.

Figure 8:
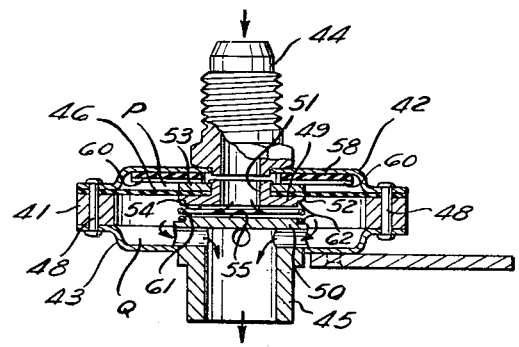
FIG. 8 is a side elevation in full section of the valve shown in FIGS. 6 and 7 taken in the plane of line 8—8 in FIG. 7 and showing the valve in its open position.
Figure 7:
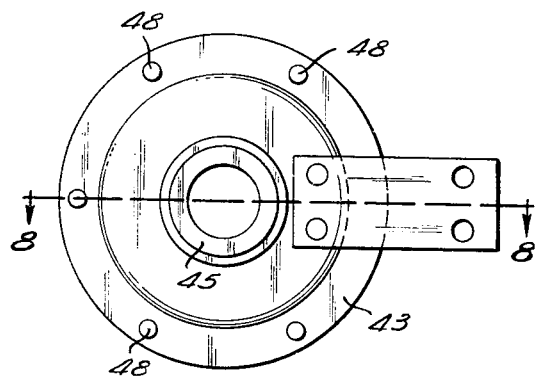
FIG. 7 is a bottom elevation view of the valve shown in FIG. 6.
Figure 9:
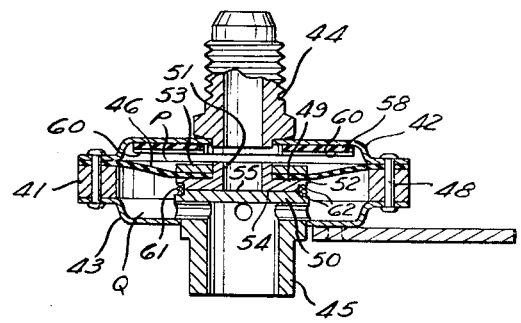
FIG. 9 is a view similar to FIG. 8 but showing the valve in its closed position.

The single diaphragm valve of FIGS. 6 through 9 is shown in its open position in FIG. 8. In FIG. 9, the valve is closed as the result of a pressure drop developed through central orifice 51 and acting upon diaphragm 46 with a total force sufficient to compress spring 61 and bring end face 54 into valving engagement with circular surface 55. As these two surfaces begin to be moved together by the aforementioned pressure differential from their widely spaced positions shown in FIG. 8, the flow of fluid through the passage formed between end face 54 and circular surface 55 speeds up and the pressure therebetween falls, drawing end faces 54 to surface 55 with a snap action and closing off central orifice 51 and preventing further fluid flow through the valve. The valve opens again when the force of spring 61 exceeds the force developed by the pressure difference acting on the area of diaphragm 46.

As in the double diaphragm valve, the engaging end face 54 and circular surface 55 may be formed of resilient material or carry resilient seals to limit any leakage when the valve is closed. Also, the closing and opening pressures and/or fluid flow can be varied by changing the size of central orifice 51, the maximum spacing between end face 54 and circular surface 55, the area of diaphragm 46, the contour of end face 54, and/or the force produced by spring 61. Variations in these factors effect the valve operation in much the same way as described above in connection with the double diaphragm valve.

In a valve of either type described above, the diameter of the effective area of the diaphragm is about 1¾ inches. The outside diameter of the surfaces of engagement are both about 11/16 of an inch and the diameter of the central orifice in the movable valve member is 5/16 of an inch. When the valve is fully open, the end faces are spaced from each other about 3/32 of an inch. The compression spring acts with a force of about 3/16 pound when the valve is open as shown in FIGS. 3 and 8 and with a force of approximately ⅓ pound when compressed by the closing of the valve. The valve snaps closed suddenly when the pressure differential across the diaphragm and central orifice reaches approximately two inches of mercury and fluid flow through the open valve is approximately 24 c.f.m. in the single diaphragm valve and about 3 c.f.m. in the double diaphragm type valve. The opening point of the valve occurs at a pressure differential of approximately one inch of mercury.

It will be noted in the illustrative valve dimensions and operating valves set forth for both single and double diaphragm type valves that closing pressures are higher than the opening pressures. This relationship between the opening and closing pressures can be inverted by the proper choice of spring loads, face sizes and spacing, and diaphragm sizes so that the Bernoulli effect becomes a predominant factor among those tending to close the valve.

It will also be noted that the double diaphragm type valve operates on a much lower flow rate. This results from the additional control force obtained through the use of two diaphragms and the ram effect pressure differential established behind the downstream one of them. This ram effect pressure differential also provides an additional element of control over the valve's operating characteristics.

In connection with the descriptions of both valves above, various parts present in the valves have been qualified as "upper" and "lower." These designations are intended to be related only to the orientation of the valves as shown in FIGS. 3, 4, 6, 8, and 9. The valves successfully operate in the manner described above when oriented in any position. Preferably, the outlet fitting is directed downwardly when the valve is installed in an aircraft as a cylinder head drain valve.

From the foregoing, it will be apparent that the invention comprehends two-way valves, or valves having an open and closed position for controlling fluid flow and which are adapted to close not only in response to a differential in inlet and outlet pressure, but also in response to changes in rate of flow through the valve. The invention also comprehends valves having widely varying operating characteristics useful in various applications and accommodated by variation of a few controlling factors and/or dimensions. The invention permits such a valve to be economical of cost, weight, and space.

Changes, modifications, and improvements may be made to the above-described preferred and modified forms of the invention without departing from the precepts and principles of the invention. Therefore, the patent should not be limited to any particular form of this invention specifically illustrated and described nor in any manner inconsistent with the extent to which the invention has promoted the art.

I claim:
1. A valve for controlling fluid flow in a path therethrough, said valve comprising
    a pair of variably spaced and engageable valve members adapted to permit fluid flow through the valve when spaced apart and to prevent fluid flow through the valve when engaged, and
    flow-sensitive means responsive to fluid flow through the valve tending to bring said valve members into engagement, said means comprising
        a pair of surfaces oppositely disposed and facing each other providing a restricted passage therebetween and in the fluid flow path through the valve, said surfaces being fixedly related to said valve members and variably spaced from each other transversely of said passage between them in proportion to the spacing between said valve members, said surfaces tending to be drawn toward each other to further restrict the passage therebetween and to draw said valve members into engagement by decreased pressure between said surfaces produced by increasing fluid velocity in the restricted passage of fluid flow through the valve.

2. The valve according to claim 1 in which one of said valve members has an orifice therethrough in the fluid flow path, one side of said orifice opening toward the other of said valve members, and one of said surfaces comprising an annular end face on the orificed one of said valve members, said end face surrounding and extending radially from said orifice and facing said surface related to the other of said valve members.

3. The valve according to claim 2 in which the other of said surfaces comprises a circular face having a radial extent substantially equal to that of said one of said surfaces.

4. The valve according to claim 2 in which said valve member having said orifice therethrough is mounted through a movable diaphragm supported across said fluid flow path through the valve with opposite sides of said movable diaphragm in communication through said orifice, said diaphragm mounted valve member and said annular end face surface related thereto being movable toward said other valve member and said surface related thereto in accordance with different pressures acting on opposite sides of said diaphragm as a result of fluid flow through said orifice.

5. The valve according to claim 1 in which both of said valve members have an orifice therethrough, only one of said orifices being in the fluid flow path, said orifices being axially aligned and opening toward each other, and each of said surfaces comprising an annular end face on its related valve member surrounding and extending radially from the orifice therein and facing and oppositely disposed from the other of said surfaces.

6. The valve according to claim 5 in which one of said orificed valve members is mounted through a first movable diaphragm supported across said fluid flow path through the valve with the upstream and downstream sides of said first movable diaphragm in communication through said orifice in said first diaphragm mounted valve member, said first diaphragm mounted valve member and said annular end face surface related thereto being movable toward said other valve member and said surface related thereto in accordance with different pressures acting on opposite sides of said first diaphragm as a result of fluid flow through said orifice of said first diaphragm mounted valve member.

7. The valve according to claim 6 in which the other of said orificed valve members is mounted through a second movable diaphragm which is supported in an axially spaced and aligned and in a generally parallel relationship to said first movable diaphragm and out of and adjacent to said fluid flow path through said valve, said second movable diaphragm closing off a sub-chamber in the valve, said sub-chamber having communication with only the fluid flow path downstream of said orifice through said first diaphragm mounted valve member by means of said orifice in said second diaphragm mounted valve member, said second diaphragm being responsive to increases in dynamic pressure of fluid flowing through said orifice in said first diaphragm mounted valve member and directed into said sub-chamber through said axially aligned orifice in said second diaphragm mounted valve member to tend to move said second diaphragm mounted valve member toward said first diaphragm mounted valve member.

8. A valve for controlling fluid flow through it, said valve comprising
    a housing having a chamber and an inlet passage into said chamber and an outlet passage out of said chamber,
    a movable diaphragm mounted in said chamber between said inlet passage and said outlet passage as a movable wall dividing said chamber into an inlet sub-chamber and an outlet sub-chamber,
    a valve member and a valve seat,
    said valve member positioned in said outlet sub-chamber on the outlet passage side of said diaphragm,
    said valve seat carried on said diaphragm for movement toward and away from and into and out of valving engagement with said valve member,
    an orifice extending from one side of said diaphragm to the other permitting fluid flow therethrough from said inlet passage to said outlet passage when said valve seat is positioned out of valving engagement with said valve member and which is closed preventing fluid flow therethrough when said valve seat is positioned in valving engagement with said valve member, said valve seat having a face, said valve member having a face disposed opposite said face on said valve seat to form therebetween a restricted passage for fluid flowing through said valve and whose transverse dimension varies with the separation between said movable valve seat and said valve member, a spring acting between and resiliently urging said movable valve seat and said valve member apart, and the greater pressure on the inlet side of said movable diaphragm provided by the pressure drop across said orifice tending to move said valve seat against the force of said spring toward said valve member and into engagement therewith and reducing the spacing and passage between said oppositely disposed faces increasing fluid flow therebetween to provide a fluid velocity related reduction in pressure between said faces tending to quickly draw them together and to close said valve seat against said valve member.

9. The valve according to claim 8 in which said orifice extends from one side of said diaphragm to the other through said valve seat and in which said valve seat face is adjacent the outlet end of said orifice.

10. A valve for controlling fluid flow through it by automatically closing when the pressure differentials developed by fluid flow through it exceed a predetermined amount and by automatically opening when the pressure drop across it falls below a predetermined amount, said valve comprising a housing having a chamber and an inlet passage into said chamber and an outlet passage out of said chamber, a movable diaphragm mounted in said chamber between said inlet passage and said outlet passage as a movable wall dividing said chamber, said diaphragm having an upstream side adjacent said inlet and a downstream side adjacent said outlet, a valve member and a valve seat, said valve member fixedly mounted to said housing in said chamber on the downstream side of said diaphragm, said valve seat mounted on and through said movable diaphragm for movement toward and away from and into and out of valving engagement with said valve member, said valve seat having an orifice extending through it and providing a fluid flow path from one side of said diaphragm to the other and which path is open permitting fluid flow through the valve from said inlet passage to said outlet passage when said valve seat is out of engagement with said valve member and which path is closed preventing fluid flow through the valve when said valve seat is in engagement with said valve member, said valve seat having a face adjacent the outlet end of said orifice, said valve member having a face disposed opposite said face on said valve seat to form therewith a restricted passage in the fluid flow path through said valve and whose transverse dimension varies with the separation between said movable valve seat and said valve member, a spring acting between and resiliently urging said movable valve seat and said valve member apart, and the greater pressure on the inlet side of said movable diaphragm provided by the pressure drop across said orifice in said valve seat tending to move said valve seat against the force of said spring toward said valve member and into engagement therewith and reducing the spacing and passage between said oppositely disposed faces increasing fluid flow therebetween to provide a fluid velocity related reduction in pressure between said faces tending to quickly draw them together and to close said valve seat against said valve member.

11. A valve for controlling fluid flow through it by automatically closing when pressure differentials developed by fluid flow through it exceed a predetermined amount and by automatically opening when the pressure drop across falls below a predetermined amount, said valve comprising a housing having a chamber and an inlet passage into said chamber and an outlet passage out of said chamber, first and second movable diaphragms mounted in said chamber axially spaced from and aligned with and generally parallel to each other, said first movable diaphragm extending across said chamber between said inlet passage and said outlet passage as a movable wall dividing said chamber, said second movable diaphragm extending across said chamber between said outlet passage and one side of said chamber as a movable wall closing off a portion of said chamber from said inlet and outlet passages, a first and a second valve member mounted through and centrally of said first and second movable diaphragms respectively and for movement therewith toward and away from engagement with each other, said first valve member having an orifice in axial alignment with the direction of movement of said first valve member and extending therethrough from said inlet passage side to said outlet passage side of said first diaphragm for providing a fluid flow path through the valve between said inlet and outlet passages and restricted at said orifice providing a pressure differential between the opposite sides of said first movable diaphragm when fluid flows through said orifice, said pressure differential tending to move said first valve member downstream toward said second valve member, said second valve member having an orifice extending in axial alignment with the direction of movement of said second valve member and with said orifice in said first valve member therethrough placing said closed-off portion of said chamber in communication with said outlet passage and pressure thereat, said orifice being axially aligned with said orifice extending through said first valve member and directly in the path of fluid flowing out of said first valve member orifice from said inlet passage side of said first diaphragm producing a dynamic ram effect pressure in said closed-off portion of said chamber tending to move said second valve member toward said first valve member.

an annular valve seat face surrounding and extending radially from each of said orifices in said first and second valve members and coaxially aligned and facing the other and lying in a plane generally normal to the path of movement of said valve members to and from each other and providing a variable annular restriction in said fluid flow path on the outlet side of said first movable diaphragm tending to grow narrower as said valve members move toward each other and until they engage each other and wider as said valve members move away from and out of engagement with each other, the fluid flow velocity increasing with decreasing spacing between said annular valve seat faces and lowering the pressure therebetween tending to draw said valve seat faces together and into engagement with each other closing said valve, a spring tending to hold said valve members and their annular valve seat faces apart and said valve open.

References Cited

UNITED STATES PATENTS

| 28,722 | 6/1860 | Whitaker | 137—508 |
|---|---|---|---|
| 938,134 | 10/1909 | Etheridge | 137—533.19 |
| 1,339,101 | 5/1920 | Church | 137—533.19 |
| 2,219,408 | 10/1940 | Benz et al. | 137—498 |
| 2,604,900 | 7/1952 | Hewitt | 137—498 XR |
| 2,710,626 | 6/1955 | Burdick et al. | 137—498 |
| 3,097,280 | 7/1963 | Schimming et al. | 137—498 XR |
| 3,173,445 | 3/1965 | Mitchell | 137—498 XR |
| 3,173,446 | 3/1965 | Mitchell | 137—498 |

M. CARY NELSON, Primary Examiner

R. J. MILLER, Assistant Examiner

U.S. Cl. X.R.

137—510